United States Patent [19]

Halbfoster

[11] 4,190,532
[45] Feb. 26, 1980

[54] CHARGED FILTER AID MATERIAL AND ION EXCHANGE BED

[75] Inventor: Christopher J. Halbfoster, Greenbrook, N.J.

[73] Assignee: Ecodyne Corporation, Union, N.J.

[21] Appl. No.: 844,319

[22] Filed: Oct. 21, 1977

Related U.S. Application Data

[63] Continuation-in-part of Ser. No. 695,098, Jun. 11, 1976, abandoned.

[51] Int. Cl.² ............................................. B01D 37/02
[52] U.S. Cl. ..................................... 210/75; 210/504; 210/505; 210/508
[58] Field of Search ............... 210/24 R, 36, 502, 503, 210/504, 505, 510, 37, 38 C, 75, 509; 252/426; 428/403, 404, 407; 427/212, 221

[56] References Cited

U.S. PATENT DOCUMENTS

| | | | |
|---|---|---|---|
| 3,242,073 | 3/1966 | Guebert | 210/501 |
| 3,250,702 | 5/1966 | Levendusky | 210/24 |
| 3,352,424 | 11/1967 | Guebert | 210/36 |
| 3,600,329 | 8/1971 | Enriquez | 252/426 |
| 3,835,041 | 9/1974 | Grant | 210/27 |

OTHER PUBLICATIONS

Problems of Chemistry and Physics of Power Plants. The Performance and Possibilities of Application of Filters Utilizing Powdered Ion Exchange Resins, Aug. 27, 1968.

Balthazar, J., "Belgian Experience with Powdered Resin Filter", Trib. Cebedeaux, Oct. 1969.

Balthazar, J., "Methodical Investigations of Continuous Condensate Purification with Powdered Resin Alliuvial Filters", VGB Feed Water Convention, 1971.

Balthazar, J., "Ion Purification of Condensates by Powdered Resin Filters", Laborelec Report NI 14.S5.

Betz Handbook of Industrial Water Conditioning, 7th Edition, 1976, pp. 53–56.

Primary Examiner—Thomas G. Wyse
Assistant Examiner—Ernest G. Therkorn
Attorney, Agent, or Firm—David A. Anderson

[57] ABSTRACT

A method for preparing an improved filter material, together with the improved material prepared thereby and an improved method for removing impurities from a liquid. The filter material comprises a mixture of ion exchange resin particles and treated filter aid material. In the preferred embodiment, the ion exchange resin particles comprise a mixture of anion and cation exchange resin particles, and the filter aid material is treated with a chemical compound to produce a positive surface charge thereon. The filter aid material may be further treated with a second compound to produce an enhanced negative surface charge.

27 Claims, 1 Drawing Figure

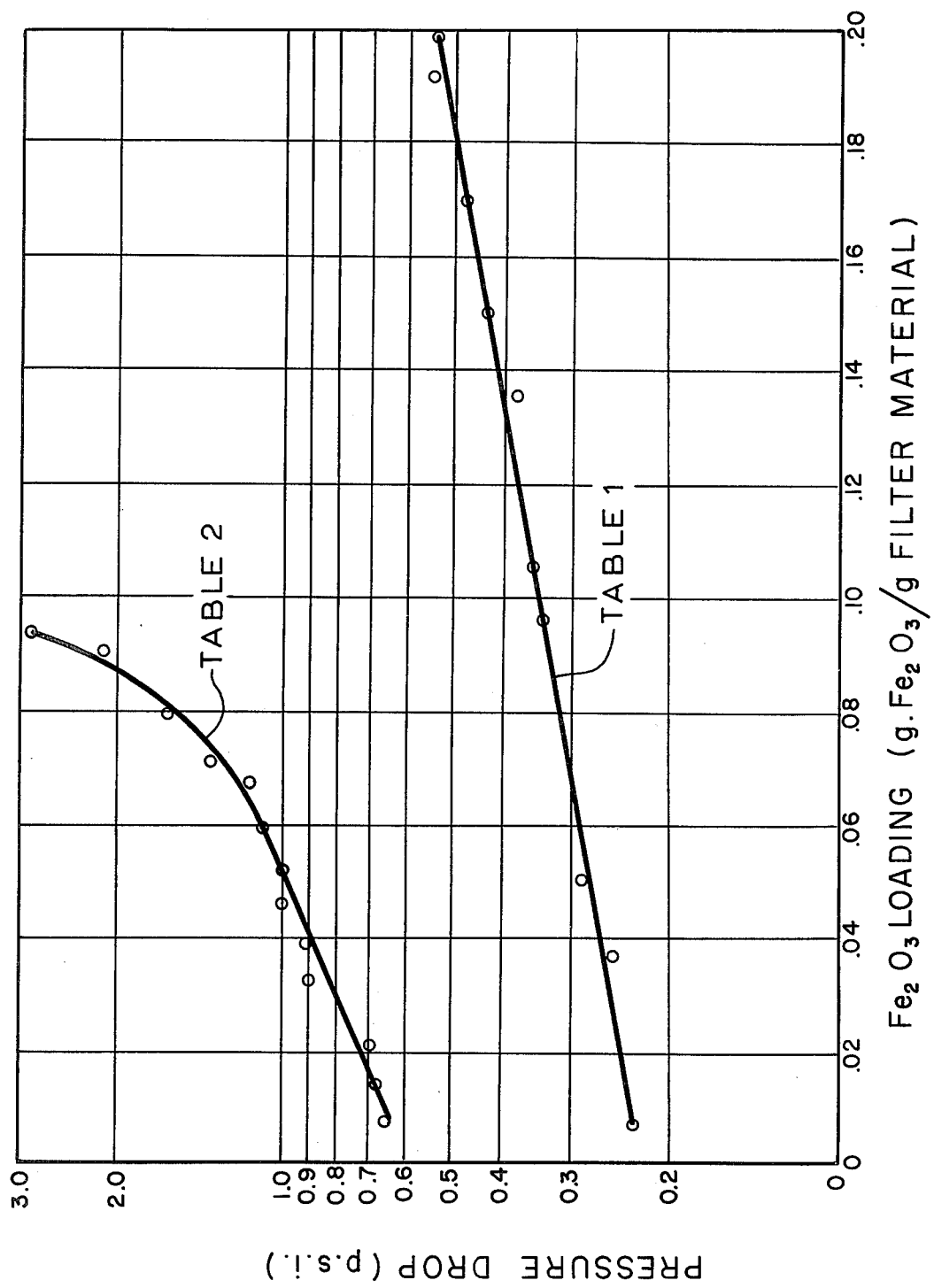

CHARGED FILTER AID MATERIAL AND ION EXCHANGE BED

This is a continuation-in-part of copending application Ser. No. 695,098, filed June 11, 1976 now abandoned.

The present invention relates to an improved filter material and to an improved method for removing impurities from a liquid.

In certain water treatment applications, there is a requirement for the production of extremely pure water, including the removal of both dissolved and suspended or colloidal materials. One area where such a requirement is particularly important is in the steam generation of electrical power, in both fossil fuel and nuclear power plants. In both types of installations, it is common practice to include a filter bed in the recycle stream for the steam turbines. In a nuclear power plant, there is also a requirement for the highly efficient removal of dissolved and undissolved impurities in the so-called "radwaste" systems which are associated therewith. These radwaste systems are used to remove both radioactive and non-radioactive impurities from liquid streams that are employed in connection with the operation of the power plant, including in large part liquids that have been used to backwash exhausted filter beds.

A significant breakthrough in the purification of such liquid streams was the invention of Joseph A. Levendusky, which is described and claimed in U.S. Pat. Nos. 3,250,702 and 3,250,703, both of which are assigned to the assignee of this application. The Levendusky invention is grounded on the discovery that when finely divided anion and cation exchange resin particles are mixed in aqueous suspension, a volume increase is noted. This increase is believed to be the result of an agglomeration or "clumping" between the anion and cation exchange resin particles. Such resin particles, when used to form a filter bed, produce significantly reduced pressure drops across the bed, together with longer run lengths and improved efficiency of dissolved and undissolved solids removal.

Despite these significant advantages of the Levendusky invention, the use of mixed anion and cation exchange resin particles as a filter has drawbacks. Significant among these is a tendency of these filter beds to crack, particularly in the presence of suspended iron oxides. Once a filter bed cracks, a complete breakdown of the filtration ability of the bed may result. A second disadvantage is that such filter beds have sometimes been unsatifactory in the removal of other suspended materials such as silica. Such filter beds are also expensive, because of their reliance on expensive anion and cation exchange resins, which are not regenerated, but which are simply disposed of subsequent to use. A third disadvantage of mixed finely divided ion exchange resins is that they perform poorly in the removal of oil from water. A fourth problem with mixed ion exchange resins is that of "resin bleedthrough". This is particularly a problem when the resin particles are precoated onto stainless steel filter elements, where the resin particles themselves pass through the element and contaminate the liquid stream. Finally, a bed made up entirely of ion exchange resins often is not required because the primary problem is the removal of suspended and colloidal impurities, rather than dissolved materials.

In an effort to overcome these difficulties, a practice has been adopted of placing an "overlay" of conventional filter aid material, such as regenerated cellulose, on top of the mixed anion and cation exchange resins. The purpose of this overlay is to remove suspended and colloidal iron oxides before they can reach the resins, and also to improve the removal of colloidal silica. However, such an overlay has the disadvantages that it increases the complexity of precoating the filter bed onto the filter, and also increases pressure drop across the filter. Furthermore, such overlays tend to mat, making the filter bed much more difficult to backwash and remove from the filter support.

As used herein, the term "bed" refers to a layer of filtration material, such as a pre-coat layer, which has been deposited on a filter support such as a filter screen, an annular filter cartridge, a film, a deep or shallow bed, or the like. Such a bed may advantageously be deposited on an annular filter cartridge such as those described in U.S. Pat. No. 3,279,608, which is assigned to the assignee of this application. In general, a shallow bed is to be preferred over a deep bed because of the desire to minimize the pressure drop, thereby generally increasing the run length that is available.

It is also to be understood in connection with the present application that when ratios or percentages of resins or filter aid materials are discussed, applicant always refers to the dry weight of the material involved.

Generally, the present invention relates to an improved filter material. The present invention also relates to an improved method for removing impurities from a liquid which carries with it virtually all of the advantages, and overcomes many of the disadvantages, of the prior art. The method of the present invention produces significantly improved removal of iron oxides and other suspended and colloidal impurities, and at the same time reduces the cost of the precoat material when compared to the use of mixed ion exchange resin particles.

In preparing the filter material of the present invention, a filter aid material is first treated in aqueous suspension with an electrolyte-type compound that produces a positive surface charge thereon. The filter aid material is one that is characterized by a negative surface charge in aqueous suspension prior to such treatment. The treated filter aid material is then mixed with ion exchange resin particles in the size range of 60 to 400 mesh. The mixture of treated filter aid material and ion exchange resin particles produces a clumping phenomenon similar to that achieved in accordance with the Levendusky invention.

The present invention also relates to the improved filter material prepared by the foregoing method. The material comprises a mixture of ion exchange resin particles and filter aid material, the resin particles being in the size range of about 60 to 400 mesh. Again, the treated filter aid material is characterized by a negative surface charge prior to treatment, and has been treated with a chemical compound that produces a positive charge thereon.

The ion exchange resins employed will ordinarily be fifty percent or more cation exchange resin particles in the size range of about 60 to 400 mesh. In the preferred embodiments of the invention, these cation exchange resins are mixed with anion exchange resin particles in the same size range. It is also possible to employ resin mixtures that are predominantly anion exchange resin particles, or even entirely anion exchange resin. However, when the anion exchange resin predominates, it is preferred to treat the treated filter aid material a second time with an anionic polyelectrolyte in order to produce an enchanced negative surface charge thereon. When mixed resin particles are employed, the preferred range of mixtures is from about 5 to about 95 percent of one of the two resins, based upon the total weight of the resin particles.

By the term "filter aid material," applicant refers to those materials that are conventionally deposited on a filter screen or the like in order to aid the filtration which is produced by the filter. Most such materials are characterized by an electronegatively charged surface in the presence of water. Such materials are well known in the art, and include cellulose fibers, diatomaceous earth, charcoal, expanded perlite, asbestos fibers, polyacrylonitrile fibers, and the like. Particularly preferred filter aid materials for use in accordance with the present invention are cellulose fibers, which are available commercially under the trade name Solka-Floc.

A wide variety of chemical compounds, referred to herein as electrolyte-type compounds, may be employed in accordance with the present invention in order to produce a positive surface charge on the filter aid particles. Such compounds must be miscible with water, and the compounds must have a plurality of charge sites in order to form a bond with the filter aid material and to have charge sites remaining to produce a surface charge that is the reverse of the normal surface charge. Suitable non-polymeric cationic-type compounds include 1-carboxymethyl pyridinium chloride and cetyl pyridinium chloride.

The preferred chemical compounds in accordance with the present invention is an organic cationic polyelectrolyte. Suitable cationic polyelectrolytes include linear polyelectrolytes characterized by little, if any, cross-linking. Such polyelectrolytes are well known in the art, and a variety are commercially available. Examples of such polyelectrolytes include polyalkylene imines, polyalkylene polyamines, polyvinylbenzyl quaternary ammonium salts, polyvinylbenzyl tertiary amines, vinylbenzylsulfonium polymers, etc. Specific compounds that could be employed include, for example, poly(1-butyl-4-vinyl pyridinium bromide), and poly(1,2-dimethyl-5-vinyl pyridinium methyl sulfate). A particularly suitable cationic polyelectrolyte is one characterized by the repeating structure:

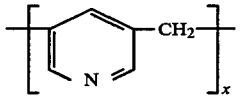

However, it should be understood that the abovementioned specific compounds are not the only ones that can be utilized, as many cationic polyelectrolytes are well known in the art, and it would be well within the ability of one of ordinary skill in the art to select a suitable cationic polyelectrolyte.

In accordance with the preferred embodiment of the present invention, the treated filter aid materials are mixed with a mixture of cation and anion exchange resins in the size range of 60-400 mesh. The ratio of cation to anion exchange resins that may be employed ranges from about 5% to about 95% of one of the two resins, based upon the total weight of the resins. However, it has been found that, in the percentage ranges where the anion exchange resin predominates, it is often beneficial to employ filter aid materials having an enhanced electronegative surface charge rather than a positive surface charge. In order to produce this enhanced electronegative surface charge, a so-called "double treatment" of the filter aid material is employed. In carrying out this double treatment, the filter aid material is first treated with a cationic polyelectrolyte of the type described above. The material is then treated with an anionic polyelectrolyte, which reverses the surface charge, producing an electronegative surface charge which is enhanced as compared to the original negative charge. The anionic polyelectrolytes must be miscible with water. Such polyelectrolytes include polymeric acids such as polyacrylic acids, polysulfonic acids, etc. Suitable anionic polyelectrolytes are again well known to those skilled in the art, and it is well within the ability of one of ordinary skill in the art to select a suitable material.

The application of chemical compounds to the filter aid materials is carried out in aqueous suspension. In carrying out the preferred method, the filter aid material is simply suspended in water using a mechanical stirrer or the like, and an adequate amount of chemical compound is added to produce an overall positive surface charge. With high molecular weight polyelectrolytes (i.e., those having molecular weights in excess of 100,000), the point at which adequate polyelectrolyte has been added can be determined by observing the filter aid material as the polyelectrolyte is added. Initially, the suspended filter aid material will be seen to expand in volume. This volume expansion will then disappear when a reversal of substantially all of the surface charge has been accomplished.

With nonpolymeric compounds, with lower molecular weight polyelectrolytes, and even with some combinations of high molecular weight polyelectrolytes and filter aid material, no noticeable volume expansion is produced when the polyelectrolyte is added. In those instances, an adequate amount of polyelectrolyte must be determined by experience. In this regard, it should be borne in mind that it is not possible to employ too much polyelectrolyte, as any excess simply will not bond to the surface of the filter aid material once the negative charge sites have been used up. However, economics obviously dictate that the minimum amount to produce the desired result be employed. As a general matter, at least about 5% of the chemical compound, whether a polyelectrolyte or nonpolymeric material, is required, based upon the dry weight of the filter aid particles. Of course, the precise amount required in a particular case depends upon many factors, including the nature of the particles being treated and the number of positive charge sites that are available on the chemical compound being added.

The foregoing procedure is also employed for the treatment with the anionic polyelectrolyte when the so-called "double treatment" is employed.

In making up filter material in accordance with the present invention, the preferred method is to first slurry the ion exchange resin in a relatively large volume of demineralized water, say 10 gallons of water per pound of resin. The treated filter aid material is then added with continuous stirring to ensure homogeneous mixing. It has been found that, when the treated filter aid material having a positive surface charge is mixed with cation exchange resin, a volume expansion of the suspension is produced, similar to the so-called "clumping"

phenomenon described in the aforementioned Levendusky patents. After a sufficient period of stirring to ensure complete mixing, say 5–20 minutes, the anion exchange resin is added, and stirring is continued for a similar period to ensure complete mixing of all three materials. The addition of the anion exchange resin ordinarily produces a reduction in the volume of the suspended material. Generally, however, the volume of the suspension will still be larger than that desired for precoating onto a filter bed, and the supernate may also contain anion exchange resin fines. The volume may be further reduced, and the supernate clarified, by the addition of a suitable water-soluble polyelectrolyte such as polyacrylic acid in relatively small amount, say 1–10 ml. per dry pound of anion exchange resin. Such a method of controlling the volume of mixed, suspended anion and cation exchange resin is well known in the art, and is described in U.S. Pat. No. 3,250,704, which is assigned to the assignee of the application.

When the filter aid material employs a "double-treated" filter aid, the filter aid is preferably first mixed with the anion exchange resin particles, which will produce a volume expansion of the type described above. The cation exchange resin particles are subsequently added to the suspension.

The filter material of the present invention may be prepared as set forth above, dewatered, and stored for furture use. Alternatively, the components may be mixed immediately prior to being used to form a filter bed. When the material is dewatered and stored, it is simply resuspended in a suitable volume of water and deposited to form a filter bed according to methods that are well known in the art.

As previously stated, the ratio of cation to anion exchange resins should be in the range of 5% to 95%, based upon the total weight of the resin particles. Preferably, the amounts of the two resins are about equal or the cation exchange resin predominates. Suitable cation and anion exchange resins that may be employed in accordance with the present invention are of the strong acid and strong base type. Such resins are described in the aforementioned Levendusky patents, and are well known in the art. Typical solid cation exchange resin particles include those of the divinylbenzene-styrene copolymer type, the acrylic type, the sulfonated coal type, and the phenolic type. Such resins may be used in the sodium, hydrogen, ammonium, or hydrazine form, for example. Typical solid anion exchange resin particles that may be employed are the phenolformaldehyde type, the divinylbenzene-styrene copolymer type, the acrylic type, and the epoxy type. These resins may be used in the hydroxide or chloride form, for example. In most cases, the cation exchange resin will be present in the hydrogen or ammonium form, and the anion exchange resin will be present in the hydroxide form. Such resins are sold in the large bead form under the trade names of Amberlite IR-120 and Amberlite IRA-400, manufactured by the Rohm & Haas Company, and Dowex HCR and Dowex SBR, sold by Dow Chemical Company.

The amount of treated filter aid material employed in accordance with the present invention varies according to a number of factors, primary among which is the level of ion exchange capacity that is desired to be retained in the filter bed. Generally, the amount of filter aid material may be varied within the range of 20–80%, based upon the total weight of the anion and cation exchange resins present.

Once the precoat material has been prepared in aqueous suspension, it is precoated onto a filter according to methods which are well known in the art. Simply stated, the precoat is formed by recirculating the suspension through the filter until a clarified effluent is obtained. The filter is then ready for use in the removal of impurities from liquids.

The following examples are intended to illustrate the present invention, and to compare it with the filter beds employed in the prior art. These examples should not be considered to limit the present invention, the scope of which is determined by the claims.

EXAMPLE I 500 ml. of demineralized water was placed in a one-liter beaker equipped with a magnetic stirrer, and 9 grams of regenerated cellulose, available under the trade name Solka-Floc BW-20, were suspended, utilizing the stirrer. While stirring was continued, 3 grams of a commercially available polyamide-type cationic polyelectrolyte were added. This particular polyelectrolyte has a molecular weight in the range of 20,000–100,000, and is sold under the trade name "Betz 1175" by the Betz Company, Trevose, Pa. Stirring was continued for one hour to insure complete mixing, and the treated material was dewatered using a Buchner funnel and set aside.

In a second one-liter beaker, 4.5 grams cation exchange resin particles was suspended in 500 ml. of demineralized water utilizing a magnetic stirrer. This cation exchange resin was in the size range 60–400 mesh, was of the styrene-divinylbenzene type with sulfonate active groups, and was in the hydrogen form.

The dewatered treated filter aid material was added to the cation exchange resin while stirring was continued. A significant expansion of volume was observed. Stirring was continued for 10–15 minutes, and 4.5 grams anion exchange resin was then added, with continuous stirring. The anion exchange resin was also ground in the size range of 60–400 mesh, and was a commercially available material having a styrene-divinylbenzene backbone chain with quaternary ammonium active groups. The anion exchange resin was in the hydroxide form. 4.9 ml. of a 1% solution of polyacrylic acid were then added, while stirring was continued, in order to clarify the supernate and further reduce the volume of the precoat material.

The precoat material was then deposited onto a pilot plant filter element, which consisted of a single, tubular, stainless steel filter element having nominal particle retention rating of 70 microns, and a surface area available for filtration of 0.2 ft.$^2$. The filter element was precoated with the material by recirculating the slurry through the element until a clear recycle stream was produced, indicating that all of the material had been precoated onto the element. This procedure produced a uniform precoat having a depth of about ¼ inch.

An aqueous suspension containing 500 parts per billion iron as $Fe_2O_3$ was passed through the precoated filter element at a temperature of 50°±2° C. and at a constant flow rate of 0.8 gallons per minute. A portion of the effluent stream was diverted, and iron oxide was collected on a 0.45 micron Millipore filter, and was analyzed for iron using the o-phenanthroline method. Pressure drop across the filter was measured with a mercury manometer attached to the influent and effluent lines. The results, expressed in terms of pressure drop across the filter versus Fe₂O₃ loading of the filter are shown in the following table:

Table 1

| Pressure Drop (p.s.i.) | $Fe_2O_3$ loading (g. $Fe_2O_3$/g. precoat material) |
|---|---|
| 0.234 | 0.007 |
| 0.252 | 0.036 |
| 0.288 | 0.50 |
| 0.342 | 0.086 |
| 0.360 | 0.107 |
| 0.378 | 0.136 |
| 0.432 | 0.150 |
| 0.468 | 0.171 |
| 0.540 | 0.192 |
| 0.540 | 0.200 |

In calculating $Fe_2O_3$ loading, it is assumed that all of the $Fe_2O_3$ was deposited on the filter. This assumption could be seen to be valid, as the analysis of the effluent showed only 0.62 ppb Fe.

In order to obtain a comparison with the results set forth above, an identical experiment was conducted utilizing mixed anion and cation exchange resins without the addition of treated filter aid material, as described in the aforementioned U.S. Pat. No. 3,250,702. The procedure employed was exactly the same as that discussed in Example I, with the exception that 9 grams of anion exchange and 9 grams of cation exchange resin were employed. The results are shown in the following table:

Table 2

| Pressure Drop (p.s.i.) | $Fe_2O_3$ loading (g. $Fe_2O_3$/g. precoat material) |
|---|---|
| 0.658 | 0.007 |
| 0.684 | 0.014 |
| 0.702 | 0.020 |
| 0.9 | 0.032 |
| 0.918 | 0.039 |
| 1.008 | 0.046 |
| 1.04 | 0.052 |
| 1.1 | 0.060 |
| 1.17 | 0.067 |
| 1.26 | 0.070 |
| 1.6 | 0.080 |
| 2.16 | 0.090 |
| 2.85 | 0.094 |

Effluent Fe was estimated at less than 0.1 ppb by a visual examination of the effluent.

The results shown in Tables 1 and 2 were plotted in the drawing which is a semi-logarithmic plot of pressure drop versus iron oxide loading of the filter material. As can be seen from the graph, the pressure drops produced in accordance with the present invention were significantly lower than those obtained when operating with anion and cation exchange resins alone. These results were highly unexpected, in that the use of mixed anion and cation exchange resins already was believed to be a highly superior filter material.

EXAMPLE II

The following example is based upon a test that was run in the radwaste system of a nuclear power plant. In these tests, the improved method and filter bed of the present invention were compared with a diatomaceous earth filter precoat, as is widely used in the art. The plant employed tubular stainless steel filter elements having a surface area of 3.5 ft.² each. These elements were of the wedge wire type, having a diameter of about 3 inches and slotted openings in the size range of about 50–100 microns.

The diatomaceous earth was precoated onto the filters by suspending 11 pounds of diatomaceous earth in 22 gallons of demineralized water, and recirculating the suspension through the filter elements until a clear recycle stream was obtained. Thus, the diatomaceous earth was coated onto the filter element in an amount of 0.2 lb./ft.². The radwaste stream was then delivered through the filter elements at a flow rate of 0.5 gpm/ft.² until a pressure drop of 30 psi was obtained. The average number of gallons of water that could be treated before the pressure drop was reached was 7,680 gallons. The effluent was passed through a 0.45 micron Millipore filter, and produced blockage after only 100 ml. had been passed, indicating that a substantial amount of suspended solids (probably colloidal silica) was present in the effluent.

A treated filter aid material was then prepared in accordance with the present invention by suspending 5.5 lbs. of regenerated cellulose in 22 gallons of water with stirring. 0.17 lb. of the same organic cationic polyelectrolyte used in the previous example was added, and stirring was continued for 10–15 minutes. The treated material was then dewatered to 60–80% moisture.

2.7 lbs. of the same cation exchange resin employed in the preceding example was then suspended in 22 gallons of demineralized water in a tank equipped with a mechanical stirrer. The treated filter aid material was added, and stirring was continued for 10–15 minutes. 2.7 lbs. of the same anion exchange resin employed in the previous example was added, and stirring was continued for another 10–15 minutes. 13.5 ml. of polyacrylic acid were then added to clarify the supernate and to decrease the volume of the mixture. This mixture was then precoated onto the same filter elements, giving a uniform precoat of 0.2 lb./ft².

During this run, it was found that 17,000 gallons of water were passed through the filter elements before the 30 psi endpoint was reached. Thus, a run length was obtained which was over twice as long as the average run length achieved using diatomaceous earth. In addition, when the effluent was passed through the same millipore filter used before, it was found that 16 liters of water could be passed through the filter without any difficulty, indicating that the level of colloidal or suspended particles present was far below that present in the effluent in the previous run.

EXAMPLE III

The following example is based upon tests that were conducted in the radwaste disposal system of a second commercial nuclear power plant. The filter elements were of the cylindrical woven wire cloth type. These elements are cylindrical stainless steel elements having a length of 36 inches and a diameter of 1 inch, and are covered with stainless steel screen having pore openings of approximately 150–250 microns. The total surface area of each element is 1.05 ft.², and the total filter area present was 260 ft.².

The plant had been running utilizing plain regenerated cellulose, which was precoated onto the filter elements at 0.2 lb./ft.², using the technique described in Example II. The plant was never able to obtain a run length in excess of 200,000 gallons utilizing a 30 psi endpoint.

A mixture of cation exchange resin, anion exchange resin, and treated filter acid material, as in the preceding example was coated onto the filter elements, again at a level of 0.2 lb./ft.$^2$. The flow rate for all of the test runs was 0.5 gpm/ft.$^2$.

The following results were obtained when utilizing the precoat material of the present invention:

| Gallons Treated | Endpoint (psi) | Average Turbidity (FTU) | |
|---|---|---|---|
| | | Influent | Effluent |
| 305,400 | 0.2 | approx. 4.0 | less than 0.1 |
| 466,000 | 2.5 | approx. 4.0 | less than 0.1 |

The turbidity is expressed as Formazin Turbidity Units (FTU), which was measured in accordance with the method published on p. 350 of the *Standard Methods for the Examination of Water and Waste Water*, 13th ed., published by the American Public Health Association, American Waterworks Association, and Water Pollution Control Federation. An effluent turbidity level of less than 0.1 FTU is considered to be extremely good, and is comparable to the results previously obtained utilizing regenerated cellulose. As can be seen from the above data, much larger volumes of water were passed through the filter, and the pressure drop at the end of the run was far below the 30 psi obtained when utilizing plain regenerated cellulose.

EXAMPLE IV

The following tests were conducted in the radwaste disposal facility of still another commercial nuclear power plant employing filter elements of the wedge wire type having a total surface area of 130 ft.$^2$. The standard of comparison employed was a precoat of the overlay type. This precoat material was a mixture of cation and anion exchange resins of the type described in the previous examples, which were mixed at a ratio of 0.78:1 cation to anion exchange resin, and precoated onto the filter elements at a dosage of 0.32 lb./ft.$^2$ of filter surface area. This precoat of ion exchange resins was then covered with an overlay of 0.07 lb./ft.$^2$ of regenerated cellulose.

The precoat material prepared in accordance with the present invention was prepared as in the preceding examples, and was precoated onto the filter element in an amount of 0.2 lb./ft.$^2$. Data were taken at 2.5, 8.0 and 15.0 psi pressure drop.

The flow rate for all runs was 0.7 gpm/ft.$^2$. The results are shown in the following table:

| Precoat Material | Pressure Drop (psi) | Total Gallons Treated | Turbidity (FTU) | | Percent Removal |
|---|---|---|---|---|---|
| | | | Influent | Effluent | |
| overlay-type | 17 | 36,000 | 44 | 33 | 25 |
| present invention | 2.5 | 13,500 | 43 | 0.8 | 98 |
| present invention | 8.0 | 31,000 | 50 | 3.0 | 94 |
| present invention | 15.0 | 50,000 | 165 | 7.1 | 96 |

The "percent removal" is one minus the ratio of the effluent to influent turbidity multiplied by 100. As can be seen from the foregoing table, a dramatic increase in percent removal was achieved when operating in accordance with the present invention. Furthermore, the influent turbidity levels tend to indicate that material being delivered to the two filter beds was comparable in impurity levels. It is noted that run with the overlay-type precoat was made at about the same time that the run with the precoat material of the present invention was made.

During the runs set forth above, data were also collected concerning the radioactive contaminant levels in the effluents. Specifically, measurements were made of the activity of four iodine isotopes and of radioactive cobalt isotopes using a germanium-lithium detector. The gross gamma activity of the effluent was also measured using a sodium iodide detector. The results are shown in the following tables:

| Overlay-Type Precoat, 17 psi Pressure Drop | | | | | | |
|---|---|---|---|---|---|---|
| | Specific Activities (microcuries/ml) | | | | | Gross Gamma Activity (Total Counts) |
| | $I^{132}$ | $I^{135}$ | $I^{133}$ | $I^{131}$ | $Co^{58}$ | |
| Influent | 71 | 518 | 1094 | 1131 | 11 | $6.46 \times 10^6$ |
| Effluent | 0.5 | 7 | 20 | 5 | 0.3 | $0.58 \times 10^6$ |
| D.F. | 142 | 74 | 55 | 226 | 37 | 11 |

| Precoat of the Present Invention, 8 psi Pressure Drop | | | | | | |
|---|---|---|---|---|---|---|
| | Specific Activities (microcuries/ml) | | | | | Gross Gamma Activity (Total Counts) |
| | $I^{132}$ | $I^{135}$ | $I^{133}$ | $I^{131}$ | $Co^{58}$ | |
| Influent | 83 | 489 | 966 | 1244 | 26 | $6.50 \times 10^6$ |
| Effluent | 0.4 | 4 | 9 | 3 | 0.2 | $0.52 \times 10^6$ |
| D.F. | 208 | 122 | 107 | 415 | 130 | 13 |

| Precoat of the Present Invention, 15 psi Pressure Drop | | | | | | |
|---|---|---|---|---|---|---|
| | Specific Activities (microcuries/ml) | | | | | Gross Gamma Activity (Total Counts) |
| | $I^{132}$ | $I^{135}$ | $I^{133}$ | $I^{131}$ | $Co^{58}$ | |
| Effluent | 0.4 | 4 | 11 | 4 | not found | $0.82 \times 10^6$ |
| D.F.* | 208 | 122 | 88 | 249 | — | 8 |

*Readings were not taken for influent. DF based on assumption that influent readings were the same as in preceding table.

In the foregoing tables, "D.F." indicates the "decontamination factor," which is a ratio of the influent contaminants to the effluent contaminants. The objective, of course, is to obtain as high a decontamination factor as possible. As can be seen from the foregoing tables, the decontamination factors produced in accordance with the present invention were significantly higher than those obtained when employing the mixed resins and overlay material of the prior art. These results indicate very significantly improved removal of radioactive contaminants from the stream.

EXAMPLE V

In the following example, the absence of "bleed-through" tendency of the filter material of the present invention on stainless steel filter elements is demonstrated. For comparison purposes, tests were also conducted with mixed finely divided ion exchange resins and with untreated regenerated cellulose.

The runs were conducted in a pilot plant having a single, tubular, stainless steel filter element having a nominal particle retention rating of 150–200 microns and a surface area available for filtration of 0.79 ft.$^2$. In each case, sufficient filter precoat material was delivered to the element to produce a precoat dosage of 0.2 lb./ft.$^2$. The filter material was precoated by pumping a 0.5 wt. % aqueous suspension of the material through the element with recirculation at a constant flow rate of 2.75 gal/min/ft.$^2$. An in-line Hach tubidimeter was used to measure turbidity on the downstream or effluent side of the filter element.

RUN NO. 1

0.08 lb. cation exchange resin was slurried in 4 gal. demineralized water in a tank equipped with a stirrer. The resin was in the size range of 60–400 mesh, and was of the styrenedivinylbenzene type with sulfonate active groups in the hydrogen form. 0.08 lb. anion exchange resin was added with continued stirring. The anion exchange resin was also in the size range of 60–400 mesh and had a styrene-divinylbenzene backbone chain with quaternary ammonium active groups. The anion exchange resins was in the hydroxide form.

The mixed resins were recirculated through the filter element, and the following results were obtained:

| Time (min.) | Effluent Turbidity (FTU) |
|---|---|
| 1 | 50.0 |
| 2 | 37.0 |
| 3 | 10.0 |
| 4 | 3.0 |
| 5 | 1.1 |
| 6 | 0.5 |
| 7 | 0.28 |
| 8 | 0.16 |
| 9 | 0.1 |

RUN NO. 2

Run number 1 was repeated, except that 0.16 lb. regenerated cellulose was substituted for the mixed ion exchange resins. The following results were obtained:

| Time (min.) | Effluent Turbidity (FTU) |
|---|---|
| 1 | 100 |
| 2 | 100 |
| 4 | 100 |
| 6 | 10 |
| 8 | 3 |
| 10 | 1.2 |
| 12 | 0.52 |
| 14 | 0.3 |

RUN NO. 3

In this run, 0.08 lb. of the same regenerated cellulose used in the previous run was suspended in 0.3 gal. water containing 0.038 oz. "Betz 1175," a cationic polyelectrolyte described in Example I. The regenerated cellulose was dewatered using a Buchner funnel. 0.04 lb. of the cation exchange resin employed in Run No. 1 was suspended in 4 gal. water, and the treated regenerated cellulose was added with continued stirring. 0.04 lb. of the anion exchange resin employed in Run No. 1 was then added, and the entire mixture was stirred to ensure uniform mixing. The resulting mixture contained 50% of the ion exchange resins used in Run No. 1 and 50% of the regenerated cellulose used in Run No. 2, which had been treated in accordance with the present invention. The mixture was delivered through the filter element, and the following results were obtained:

| Time (min.) | Effluent Turbidity (FTU) |
|---|---|
| 1 | 2.3 |
| 2 | 2.5 |
| 3 | 0.44 |
| 4 | 0.21 |
| 5 | 0.12 |

A comparison of Run No. 3 with Runs Nos. 1 and 2 shows a dramatic decrease in effluent turbidity with the filter material of the present invention when compared with mixed ion exchange resins or with regenerated cellulose used alone. These data demonstrate a significant decrease in the tendency of the filter material of the present invention to "bleed through" the filter element during a filtration run.

EXAMPLE VI

The following example demonstrates the superior and unexpected oil removal ability of the filter material of the present invention. For comparison purposes, tests were also conducted with mixed finely divided ion exchange resins and with untreated regenerated cellulose.

These runs were conducted in the same pilot plant used in the preceding example using a tubular stainless steel filter element having a nominal particle retention rating of 76 microns and a surface area available for filtration of 0.2 ft.$^2$.

In each instance the filter material was precoated onto the filter element at a constant dosage of 0.2 lb/ft.$^2$. A suspension of SAE 10 pneumatic pump oil having a turbidity of 100 FTU was delivered to the precoated filter element at a flow rate of 4.0 gal/min/ft.$^2$, and samples were periodically removed from the effluent stream for turbidity measurements. These measurements were made with a Hach turbidimeter.

RUN NO. 1

In this run the filter element was precoated with a 50—50 mixture of the same ion-exchange resins employed in the preceding example. The following results were obtained:

| Time (min.) | Effluent Turbidity (FTU) |
|---|---|
| 15 | 0.38 |
| 30 | 0.38 |
| 45 | 1.75 |
| 60 | 2.75 |
| 75 | 4.5 |
| 90 | 5.5 |

RUN NO. 2

Run No. 1 was repeated, except that the filter element was precoated with untreated regenerated cellulose. The following results were obtained:

| Time (min.) | Effluent Turbidity (FTU) |
|---|---|
| 15 | 1.5 |
| 30 | 2.5 |
| 45 | 5 |
| 60 | 11 |
| 75 | 10 |
| 90 | 10 |
| 105 | 30 |
| 120 | 40 |
| 135 | 40 |
| 150 | 39 |

-continued

| Time (min.) | Effluent Turbidity (FTU) |
|---|---|
| 165 | 39 |

RUN NO. 3

The filter element was precoated with a filter material identical to that employed in Run No. 3 of the preceding example. The following results were obtained:

| Time (min.) | Effluent Turbidity (FTU) |
|---|---|
| 15 | 0.35 |
| 30 | 0.65 |
| 45 | 1.4 |
| 60 | 1.9 |
| 75 | 2.5 |
| 90 | 1.25 |
| 105 | 1.75 |
| 120 | 2.05 |

As can be seen from a comparison of Run No. 3 with Runs Nos. 1 and 2, the filter material of the present invention produces dramatically improved oil removal when compared to mixed ion exchange resins or regenerated cellulose used alone. Such results were totally unexpected.

Obviously, many modifications and variations of the invention as hereinbefore described will occur to those skilled in the art, and it is intended to cover in the appended claims all such modifications and variations as fall within the true spirit and scope of the invention.

I claim:

1. An improved filter material comprising: a mixture of cation exchange resin particles and treated filter-aid material, said mixture being capable of producing a clumping phenomenon said resin particles being in the size range of about 60 to 400 mesh, and said treated filter aid material being characterized by a negative surface charge prior to treatment, said filter aid material having been treated with an electrolyte-type compound that produces a positive surface charge by bonding thereon.

2. The filter material as defined in claim 1 further comprising anion exchange resin particles in the size range of about 60-400 mesh, said anion exchange resin particles comprising about 5 to 95 percent of the total weight of said resin particles.

3. The filter material as defined in claim 1 wherein said filter aid material is regenerated cellulose.

4. The filter material as defined in claim 1 wherein said electrolyte-type compound is a cationic polyelectrolyte.

5. The filter material as defined in claim 1 wherein said filter aid material is present in an amount from about 20% to about 80%, based on the weight of said resin particles.

6. An improved filter material comprising: a mixture of anion exchange resin particles, cation exchange resin particles, and treated filter aid material, said mixture being capable of producing a clumping phenomenon, said resin particles being in the size range of about 60 to 400 mesh, said anion exchange resin particles being present in an amount from about 5% to about 95% based on the total weight of said resin particles, and said filter aid material being characterized by a negative surface charge prior to treatment, said filter aid material having been treated with electrolyte-type compound that produces a positive surface charge by bonding thereon.

7. The filter material as defined in claim 6 wherein said filter aid material is present in an amount from about 20% to about 80% based on the weight of said resin particles.

8. The filter material as defined in claim 6 wherein said electrolyte-type compound is a cationic polyelectrolyte.

9. The filter material as defined in claim 8 wherein said filter aid material is regenerated cellulose.

10. An improved filter material comprising: a mixture of anion exchange resin particles and treated filter aid material, said mixture being capable of producing a clumping phenomenon, said resin particles being in the size range of about 60 to 400 mesh, and said treated filter aid material being characterized by a negative surface charge prior to treatment, said filter aid material having been treated with a cationic polyelectrolyte to produce a positive surface charge by bonding thereon, and said filter aid material having been subsequently treated with an anionic polyelectrolyte to produce an enhanced negative surface charge by bonding to said filter aid material previously treated with said cationic polyelectrolyte.

11. The filter material as defined in claim 10 further comprising cation exchange resin particles in the size range of about 60-400 mesh, said cation exchange resin particles being present in an amount from about 5% to about 95% based on the total weight of said resin particles.

12. The filter material as defined in claim 10 wherein said filter aid material is regenerated cellulose.

13. The filter material as defined in claim 10 wherein said filter aid material is present in an amount from about 20% to about 80% based on the weight of said resin particles.

14. The filter material as defined in claim 13 further comprising cation exchange resin particles in the size range of about 60-400 mesh, said cation exchange resin particles being present in an amount from about 5% to about 95%, based on the total weight of said resin particles, and wherein said filter aid material is regenerated cellulose.

15. A method for removing impurities from a liquid comprising: passing a liquid through a filter bed comprising a mixture of cation exchange resin particles and treated filter aid material, said mixture producing a clumping phenomenon, said resin particles being in the size range of about 60 to 400 mesh, and said treated filter aid material being characterized by a negative surface charge prior to treatment, said filter aid material having been treated with an electrolyte-type compound that produces a positive surface charge by bonding thereon.

16. The method as defined in claim 15 wherein said filter bed further comprises anion exchange resin particles in the size range of about 60 to 400 mesh, said anion exchange resin particles being present in an amount from about 5% to about 95% based on the total weight of said resin particles.

17. The method as defined in claim 15 wherein said filter aid material is regenerated cellulose.

18. The method as defined in claim 15 wherein said electrolyte-type compound is a cationic polyelectrolyte.

19. The method as defined in claim 15 wherein said filter aid material is present in an amount from about 20% to about 80%, based on the weight of said resin particles.

20. A method for removing impurities from a liquid comprising: passing a liquid through a filter bed comprising a mixture of anion exchange resin particles, cation exchange resin particles, and treated filter aid material, said mixture being capable of producing a clumping phenomenon, said resin particles being in the size range of about 60 to 400 mesh, said anion exchange resin particles being present in an amount from about 5% to about 95%, based on the total weight of said resin particles, and said treated filter aid material being characterized by a negative surface charge prior to treatment, said filter aid material having been treated with an electrolyte-type compound that produces a positive surface charge by bonding thereon.

21. The method as defined in claim 20 wherein said treated filter aid material is present in an amount from about 20% to about 80%, based on the weight of said resin particles.

22. The method as defined in claim 21 wherein said electrolyte-type compound is a cationic polyelectrolyte.

23. The method as defined in claim 22 wherein said filter aid material is regenerated cellulose.

24. A method for removing impurities from a liquid comprising: passing a liquid through a filter bed comprising a mixture of anion exchange resin particles and treated filter aid material, said mixture producing a clumping phenomenon, said resin particles being in the size range of about 60 to 400 mesh, and said treated filter aid material being characterized by a negative surface charge prior to treatment, said filter aid material having been treated with a cationic polyelectrolyte to produce a positive surface charge by bonding thereon, and said filter aid material having been subsequently treated with an anionic polyelectrolyte to produce an enhanced negative surface charge by bonding to said filter aid material previously treated with said cationic polyelectrolyte.

25. The method as defined in claim 24 wherein said filter bed further comprises cation exchange resin particles in the size range of about 60 to 400 mesh, said cation exchange resin particles being present in an amount from about 5% to about 95% based on the total weight of said resin particles.

26. The method as defined in claim 25 wherein said filter aid material is regenerated cellulose.

27. The method as defined in claim 25 wherein said filter aid material is present in an amount of from about 20% to about 80% based on the weight of said resin particles.